July 16, 1940.
H. A. BEEKHUIS, JR  2,208,112
PROCESS FOR PRODUCING A METAL NITRATE AND CHLORINE
FROM NITRIC ACID AND A METAL CHLORIDE
Filed Jan. 19, 1939
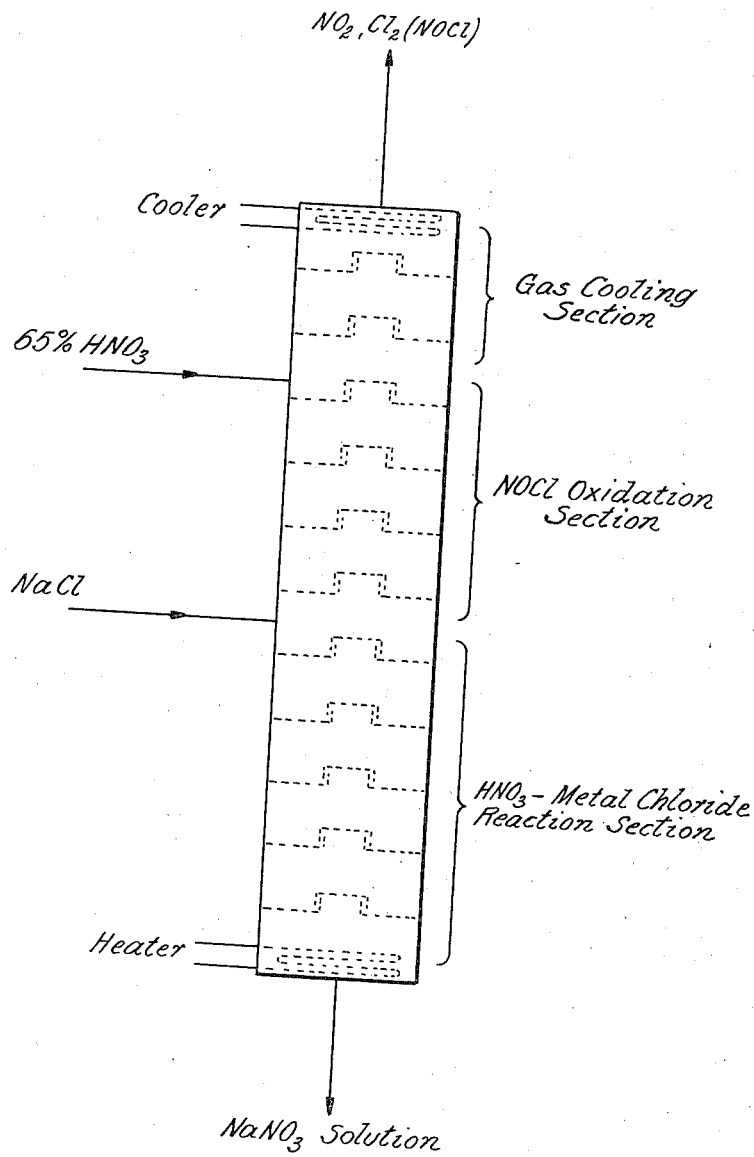
INVENTOR
*Herman A. Beekhuis, Jr.*
BY
*Charles W. Brown*
ATTORNEY Patented July 16, 1940

2,208,112

UNITED STATES PATENT OFFICE 2,208,112

PROCESS FOR PRODUCING A METAL NITRATE AND CHLORINE FROM NITRIC ACID AND A METAL CHLORIDE

Herman A. Beekhuis, Jr., Petersburg, Va., assignor to The Solvay Process Company, New York, N. Y., a corporation of New York Application January 19, 1939, Serial No. 251,737

5 Claims. (Cl. 23—102)

This invention relates to a process for reacting nitric acid and a metal chloride to form a metal nitrate and evolve a mixture of nitrosyl chloride and chlorine gases and to treating that mixture of gases to oxidize nitrosyl chloride to nitrogen peroxide and chlorine followed by drying the resulting gas to obtain a dry gaseous product which may be treated to recover its components.

It is known that nitric acid may be reacted with a metal chloride such as sodium, potassium or calcium chloride to form a metal nitrate and evolve nitrosyl chloride and chlorine. It is also known that the nitrosyl chloride may be oxidized by means of hot nitric acid to form nitrogen peroxide and chlorine. It has heretofore been proposed to carry out these reactions by a procedure in which sodium chloride and nitric acid are reacted by heating a mixture of the two to 90° to 100° C. A mixture of nitrosyl chloride and chlorine is evolved which is washed in a gas-liquid contact tower with 50% nitric acid at temperatures above 100° C. to oxidize nitrosyl chloride. The gaseous products of the nitrosyl chloride oxidation are saturated with water and nitric acid vapors at the temperature at which they leave contact with the hot nitric acid and are cooled to condense the vapors of water and nitric acid from the gas. The aqueous condensate thus obtained mingles with the acid contacted with the gas to oxidize nitrosyl chloride and the acid used for this purpose is then mixed with the sodium chloride to decompose it.

I have found that in carrying out such a procedure the oxidation of the nitrosyl chloride by 50% nitric acid at temperatures of 100° C. and higher takes place to but a small degree and even more important yet I have found when the nitrosyl chloride oxidation gases are cooled to condense vapors of water and nitric acid from these gases, the nitrogen peroxide and chlorine in the gas largely reacts with the aqueous condensate to form nitric acid and nitrosyl chloride. This reformation of nitrosyl chloride (which is a reversal of the preceding reaction of oxidizing the nitrosyl chloride by means of nitric acid) takes place rapidly. I have found that in condensing the water vapor and nitric acid from the gases saturated with these materials in contact with 50% nitric acid at temperatures of 100° C. and higher, more than 80% of the nitrosyl chloride oxidized by means of the hot acid is reformed by reaction of the nitrogen peroxide and chlorine with the condensed water and the dried gas contains nitrogen peroxide in amounts corresponding to less than 10% oxidation of the nitrosyl chloride in the original gas prior to treatment with the nitric acid. The following table shows the results obtained in carrying out such a process using 50% nitric acid at temperatures of 90° C., 100° C. and 105° C.:

| | 90 | 100 | 105 |
|---|---|---|---|
| Temperature of initial contact of the acid with the gas ..........°C.. | 90 | 100 | 105 |
| Percent oxidation of nitrosyl chloride at point the gas leaves contact with the acid.............percent.. | 15 | 32 | 48 |
| Percent oxidation of nitrosyl chloride in gas after cooling to condense water and nitric acid vapors............................................percent.. | 4 | 5 | 0 |
| Percent reversion of nitrosyl chloride oxidation reaction by cooling the oxidation gases.........percent.. | 73 | 84 | 100 |

I have discovered that by employing in the above process a nitric acid of 60% to 65% strength the percent oxidation of the nitrosyl chloride in the dried gas may be increased many fold. Not only have I found the degree of oxidation of the nitrosyl chloride by means of hot 60% to 65% nitric acid is much greater than with 50% acid, but of still greater importance to the process is the fact discovered by me that with 60% to 65% nitric acid the reversal of the nitrosyl chloride oxidation reaction which takes place upon cooling the oxidized gases to condense moisture and vapors of nitric acid from the gases is greatly repressed so that no longer is the work accomplished in oxidizing the nitrosyl chloride destroyed by the reactions taking place upon condensing the water vapor and nitric acid vapor from the oxidized gas.

Whether 50% or 60% to 65% acid is used for oxidizing the nitrosyl chloride, at the high temperatures at which it is contacted with the gas, $HNO_3$ and $H_2O$ are vaporized from the acid in proportions lower than the proportions of these constituents in the acid contacted with the gas. The reaction of $HNO_3$ with nitrosyl chloride to decompose the $HNO_3$ and to form $H_2O$ tends to decrease further the ratio of $HNO_3$ to $H_2O$ in the vapors. When the nitrosyl chloride oxidation gases are cooled the condensate rapidly reacts with the $NO_2$ and $Cl_2$ present in the gas to form a more concentrated acid and NOCl. In cooling the gases oxidized by means of 50% nitric acid, this reaction takes place to such an extent that none or little overall oxidation of the nitrosyl chloride is obtained. I have discovered, however, that by using 60% to 65% nitric acid for the oxidation of the nitrosyl chloride there is a surprisingly large repression of the reverse reaction taking place when the oxidation products are cooled so that overall oxidation of the nitrosyl chloride of as high as 50% and more may be obtained.

By comparison with the data given above, the following data shows the marked difference obtained employing 60% to 65% nitric acid as compared with 50% acid:

|  | 60% HNO₃ | | | 65% HNO₃ | | |
|---|---|---|---|---|---|---|
| Temperature of initial contact of the acid with the gas _____°C__ | 90 | 100 | 105 | 90 | 100 | 105 |
| Percent oxidation of nitrosyl chloride at point the gas leaves contact with the acid_____percent__ | 29 | 49 | 64 | 41 | 65 | 76 |
| Percent oxidation of nitrosyl chloride in gas after cooling to condense water and nitric acid vapors_____percent__ | 21 | 32 | 36 | 37 | 54 | 62 |
| Percent reversion of nitrosyl chloride oxidation reaction by cooling the oxidation gases_____percent__ | 28 | 35 | 44 | 10 | 17 | 18 |

My process involves reacting nitric acid and a metal chloride to form a metal nitrate and a gas containing nitrosyl chloride and chlorine. The gas is contacted with hot 60% to 65% nitric acid, preferably at about 100° C. or higher with counter-current flow of the acid and gas, to oxidize nitrosyl chloride to nitrogen peroxide and chlorine. The acid from the nitrosyl chloride oxidation is mixed with the metal chloride and the resulting mixture heated to react the acid and chloride to form the metal chloride and nitrosyl chloride-chlorine gas. The moist gaseous products of the nitrosyl chloride oxidation are cooled, preferably to below 30° C., to condense water vapor and nitric acid vapor and thus dry the gases. The aqueous condensate thus obtained may flow with the incoming nitric acid in contact with the nitrosyl chloride-chlorine gas in the step in which the nitrosyl chloride in that gas is oxidized, and be introduced into the reaction mixture of nitric acid and metal chloride.

My invention will be more particularly described by the following example, illustrated diagrammatically in the accompanying drawing, of one procedure for carrying out that invention.

The apparatus shown in the drawing comprises a single gas-liquid contact tower of well known type containing bubbling plates over which liquid may flow downwardly through the tower in contact with gases rising therethrough. This single tower comprises three sections. The top section is used for cooling and drying a moist gas passing upwardly therethrough. The middle section is used for treatment of nitrosyl chloride-chlorine gas with hot 60% to 65% nitric acid to oxidize nitrosyl chloride to nitrogen peroxide and chlorine. The bottom section is used for reacting nitric acid with a metal chloride to form the nitrosyl chloride-chlorine gas and a solution of metal nitrate.

In carrying out my process in this tower, 100 parts by weight per minute of substantially 65% nitric acid are continuously supplied to the top plate of the nitrosyl chloride oxidation section. 25.2 parts by weight per minute of dry sodium chloride are fed to the top of the acid-chloride reaction section. Heat is applied at the bottom of the column at a rate which will maintain a temperature of 105° C. at the top plate of the nitrosyl chloride oxidation section. The 65% nitric acid first serves in the nitrosyl chloride oxidation section to oxidize a portion of the nitrosyl chloride generated in the acid-metal chloride reaction section of the column and then passes into the latter section of the tower where it reacts with the sodium chloride introduced at the top of that section. A sodium nitrate solution formed by reaction of the nitric acid and metal chloride, substantially free of undecomposed chloride, is drawn from the bottom of the column.

By means of a cooling coil in the top of the column the gases are cooled to a temperature of about 20° C. The thus cooled gases from the nitrosyl chloride oxidation section are substantially freed of their content of nitric acid and water vapors in the gas cooling section. The aqueous condensate formed in the cooling section will be 65% or stronger nitric acid. This condensate flows into the nitrosyl chloride oxidation section and with the incoming 65% nitric acid is contacted with the nitrosyl chloride-chlorine gas to oxidize the nitrosyl chloride.

The gas formed in the acid-chloride reaction section will contain about equal molecular proportions of nitrosyl chloride and chlorine. The dried gases leaving the top of the column will have a composition substantially corresponding to the following:

| | Parts by weight |
|---|---|
| Chlorine | 13.1 |
| Nitrogen peroxide | 11.9 |
| NOCl | 3.7 |

In the process of this example, therefore, the nitrogen peroxide content of the dried gas represents better than 60% oxidation of the nitrosyl chloride formed by reaction of the nitric acid and metal chloride.

I claim:

1. The process for the production of a metal nitrate and a dry gas containing nitrogen peroxide and chlorine which comprises reacting nitric acid with a metal chloride to form a metal nitrate and evolve a gaseous mixture of nitrosyl chloride and chlorine, passing said gaseous mixture in contact with hot aqueous nitric acid containing 60% to 65% HNO₃ to oxidize nitrosyl chloride to nitrogen peroxide and chlorine, cooling the nitrosyl chloride oxidation products to a temperature at which most of the vapors of water and nitric acid contained therein are condensed and the oxidation products are thus dried while they are in direct contact with the aqueous condensate precipitated from the cooled oxidation products and mixing said aqueous nitric acid, after contacting it with said gas mixture to oxidize nitrosyl chloride, with said metal chloride to form the reaction mixture in which the metal chloride is reacted with nitric acid to produce said metal nitrate and gaseous mixture of nitrosyl chloride and chlorine,.

2. The process for the production of a metal nitrate and a dry gas containing nitrogen peroxide and chlorine which comprises reacting nitric acid with a metal chloride to form a metal nitrate and evolve a gaseous mixture of nitrosyl chloride and chlorine, passing said gaseous mixture in contact with aqueous nitric acid containing 60% to 65% HNO₃ at a temperature of about 100° C. or higher to oxidize nitrosyl chloride to nitrogen peroxide and chlorine, cooling the nitrosyl chloride oxidation products to a temperature below 30° C. thereby drying them by condensation of substantially all the vapors of water and nitric acid contained therein while the oxidation products are in direct contact with the aqueous condensate precipitated therefrom and mixing said aqueous nitric acid, after contacting it with said gas mixture to oxidize nitrosyl chloride, with said metal chloride to form the reaction mixture in which the metal chloride is reacted with nitric acid to produce said metal nitrate and gaseous mixture of nitrosyl chloride and chlorine.

3. The process for the production of a metal nitrate and a dry gas containing nitrogen peroxide and chlorine which comprises reacting nitric acid with a metal chloride to form a metal nitrate and evolve a gaseous mixture of nitrosyl chloride and chlorine, passing said gaseous mixture at about 100° C. or higher in countercurrent flow in contact with a mixture of aqueous 60% to 65% nitric acid and the aqueous condensate hereinafter described to oxidize nitrosyl chloride to nitrogen peroxide and chlorine, cooling the resulting nitrosyl chloride oxidation products to below 30° C. thereby drying them by condensation of substantially all the vapors of water and nitric acid contained therein while the oxidation products are in direct contact with the aqueous condensate precipitated therefrom, introducing the aqueous nitric acid condensate thus obtained into the aforesaid aqueous 60% to 65% nitric acid, and after contacting the aqueous nitric acid with said gaseous mixture to oxidize nitrosyl chloride, mixing the nitric acid with said metal chloride to form the reaction mixture in which the metal chloride is reacted with nitric acid to produce said metal nitrate and gaseous mixture of nitrosyl chloride and chlorine.

4. The process for the production of a metal nitrate and a dry gas containing nitrogen peroxide and chlorine which comprises continuously mixing an aqueous nitric acid with a metal chloride and heating the mixture to form gaseous nitrosyl chloride and chlorine and a solution of a metal nitrate, passing said aqueous nitric acid, prior to mixing it with metal chloride, at a temperature of about 100° C. or higher in direct contact with said nitrosyl chloride and chlorine, said acid initially containing 60% to 65% HNO₃ whereby it oxidizes the nitrosyl chloride to nitrogen peroxide and chlorine, withdrawing the resulting mixture of gases containing nitrogen peroxide, chlorine, water vapor and nitric acid vapor from contact with the aqueous nitric acid, and thereafter cooling said mixture of gases to a temperature below 30° C. in direct contact with the aqueous condensate precipitated from the cooled mixture of gases, thereby drying the mixture of gases by condensation of substantially all the vapors of water and nitric acid contained therein.

5. The process for the production of a metal nitrate and a dry gas containing nitrogen peroxide and chlorine which comprises continuously introducing into the upper portion of a liquid-gas contact tower an aqueous nitric acid containing 60% to 65% HNO₃ and flowing the acid downwardly through the tower, introducing into a mid-portion of said tower a metal chloride and mixing it with the nitric acid flowing downwardly through the tower, boiling the liquid at the bottom of the tower and passing the evolved vapors upwardly in the tower to heat the acid and metal chloride and to maintain said aqueous nitric acid in the upper portion of the tower at 100° or higher, thereby causing the mixture of nitric acid and metal chloride in the lower portion of the tower to react and evolve nitrosyl chloride and chlorine gas, passing said gas upwardly through the tower in contact with the hot nitric acid flowing downwardly therethrough, thereby oxidizing the nitrosyl chloride to nitrogen peroxide and chlorine, withdrawing the resulting gaseous oxidation products from contact with said nitric acid and then passing them over a cooler at the top of said tower, thereby cooling the oxidation products to below 30° C. and precipitating substantially all the vapors of water and nitric acid contained therein as an aqueous condensate, flowing said condensate downwardly in the top of said tower in contact with the gases flowing upwardly therein and thereafter mixing the condensate with said aqueous nitric acid containing 60% to 65% HNO₃ introduced into the upper portion of the tower.

HERMAN A. BEEKHUIS, Jr.